United States Patent [19]

Bode, Jr. et al.

[11] 3,940,292

[45] Feb. 24, 1976

[54] METHOD AND APPARATUS FOR FLAME-CUTTING CRACKED CORNER PORTIONS FROM CONTINUOUSLY CAST METAL WORKPIECES

[75] Inventors: Charles H. Bode, Jr., Bethel Park Borough, Allegheny County; Thomas A. Cuscino, Scott Township, Allegheny County, both of Pa.

[73] Assignee: United States Steel Corporation, Pittsburgh, Pa.

[22] Filed: Mar. 20, 1975

[21] Appl. No.: 560,424

Related U.S. Application Data

[63] Continuation-in-part of Ser. No. 472,767, May 23, 1974, abandoned.

[52] U.S. Cl.................. 148/9 R; 148/9.5; 266/23 R
[51] Int. Cl.²........................................... B23K 7/00
[58] Field of Search.......... 266/23 H, 23 HH, 23 R, 266/23 RC; 148/9 R, 9.5

[56] References Cited
UNITED STATES PATENTS

| | | | |
|---|---|---|---|
| 2,290,290 | 7/1942 | Meincke | 148/9.5 |
| 3,492,918 | 2/1970 | Michelson | 164/263 |
| 3,534,656 | 10/1970 | Michelson | 164/263 |

*Primary Examiner*—W. Stallard
*Attorney, Agent, or Firm*—Walter P. Wood

[57] ABSTRACT

A method and apparatus for flame-cutting cracked corner portions from continuously cast metal workpiece. The cutting torches are positioned adjacent the corners of the workpiece and are aimed downwardly at angles of about 35° to 55° with respect to the vertical and at angles of about 80° to 100° with respect to planes which bisect the corner angles of the workpiece. Preferably the torches are aimed downwardly at angles of about 45° and approximately perpendicular to the bisecting planes. In this manner the depth of segment cut from the workpiece is closely controlled and the material removed from the workpiece is directed away from the surfaces thereof.

16 Claims, 3 Drawing Figures

METHOD AND APPARATUS FOR FLAME-CUTTING CRACKED CORNER PORTIONS FROM CONTINUOUSLY CAST METAL WORKPIECES

This application is a continuation-in-part of our earlier copending application Ser. No. 472,767, filed May 23, 1974, and now abandoned.

This invention relates to an improved method and apparatus for flame-cutting cracked corner portions from continuously cast metal workpiece.

The occurrence of shallow cracks in the corners of continuously cast workpieces is a problem which never has been completely overcome. Improved mold design and more careful control of the casting operation have diminished corner-cracking, but even under optimum conditions visible cracks continue to occur in a small percentage of the product. Such cracks may be present at one or more corners along varying lengths of the workpiece, and then cease altogether along other portions of the same workpiece. After the workpiece is rolled to a finished section of small cross section, a corner crack may remain as a scarcely visible line on the surface of the section. For many purposes such a crack is harmless, but for certain premium products, it is necessary to grind off the corners of a continuously cast workpiece to assure that no cracks remain in the product.

Our invention involves selectively flame-cutting the corner portions from the workpiece while the latter is traveling through the casting machine and is at a high temperature. We recognize that it is known to flame-cut corner portions from a workpiece, for example as described in Meincke U.S. Pat. No. 2,290,290. We recognize further that it is known to employ scarfing for corner-conditioning continuously cast steel billets, as mentioned in Michelson U.S. Pat. Nos. 3,492,918 and 3,534,656. Michelson describes no details as to how the scarfing operation is conducted, but reports that it is not completely satisfactory. He says that the depth of corner removed from the workpiece cannot be closely controlled, and further that the residual melted metal adversely affects the resultant rolled product.

An object of our invention is to provide, in a continuous-casting operation, an improved method and apparatus for flame-cutting the corner portions from a workpiece in which we overcome the aforementioned difficulties; that is in which we closely control the depth of the segment cut from the workpiece, and dispose of the material removed from the workpiece without adversely affecting the product.

A further object is to provide a method and apparatus for accomplishing the foregoing object in which we aim the flame-cutting torches at critical angles enabling us to effect proper control and at the same time direct the removed material away from the surface of the workpiece.

Figure 1:
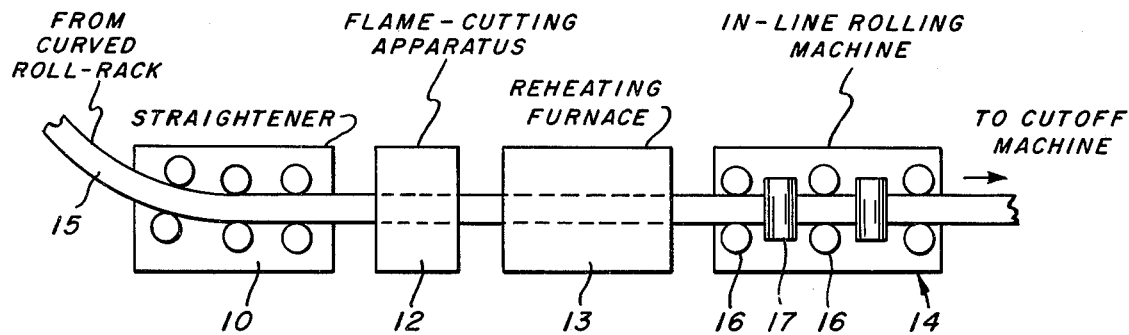
FIG. 1 is a diagrammatic side elevational view of a portion of a continuous-casting machine equipped with our flame-cutting apparatus.
Figure 2:
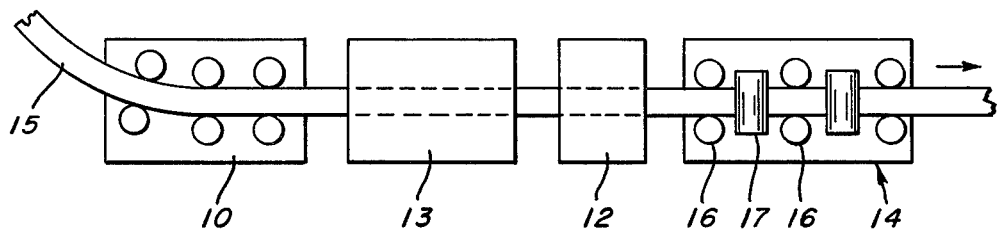
FIG. 2 is a diagrammatic view similar to FIG. 1, but showing a modification.

FIG. 1 shows diagrammatically a portion of a continuous-casting installation which includes in succession a straightener 10, a flame-cutting apparatus 12, a reheating furnace 13, and an in-line rolling mill 14. FIG. 2 shows a modified installation in which the reheating furnace 13 precedes the flame-cutting apparatus 12, but otherwise may be similar. A continuously cast workpiece 15, which is rectangular in cross section and still at a high temperature, travels from left to right through the foregoing mechanisms, coming from a curved roll rack (not shown) and going to a cutoff means (not shown). The straightener 10, which may be of conventional construction, removes the curved set from the workpiece. The flame-cutting apparatus 12 is constructed in accordance with our invention and is described in detail hereinafter. The reheating furnace 13 may be either gas-fired or an induction type, both of which are conventional. If the furnace is gas-fired, we prefer the sequence shown in FIG. 1, since the intense heat at the exit end of the furnace may damage the flame-cutting apparatus. If the furnace is of the induction type, we prefer the sequence shown in FIG. 2, since the heat is less intense than at the exit end of a gas-fired furnace, and the workpiece is hotter and easier to cut after it passes through a reheating furnace. The in-line rolling mill includes a plurality of horizontal roll stands 16 and a plurality of vertical roll stands 17, all of which may be conventional. In the event our flame-cutting apparatus is used on an installation which lacks an in-line rolling mill and reheating furnace, the apparatus simply follows the straightener.

Figure 3:
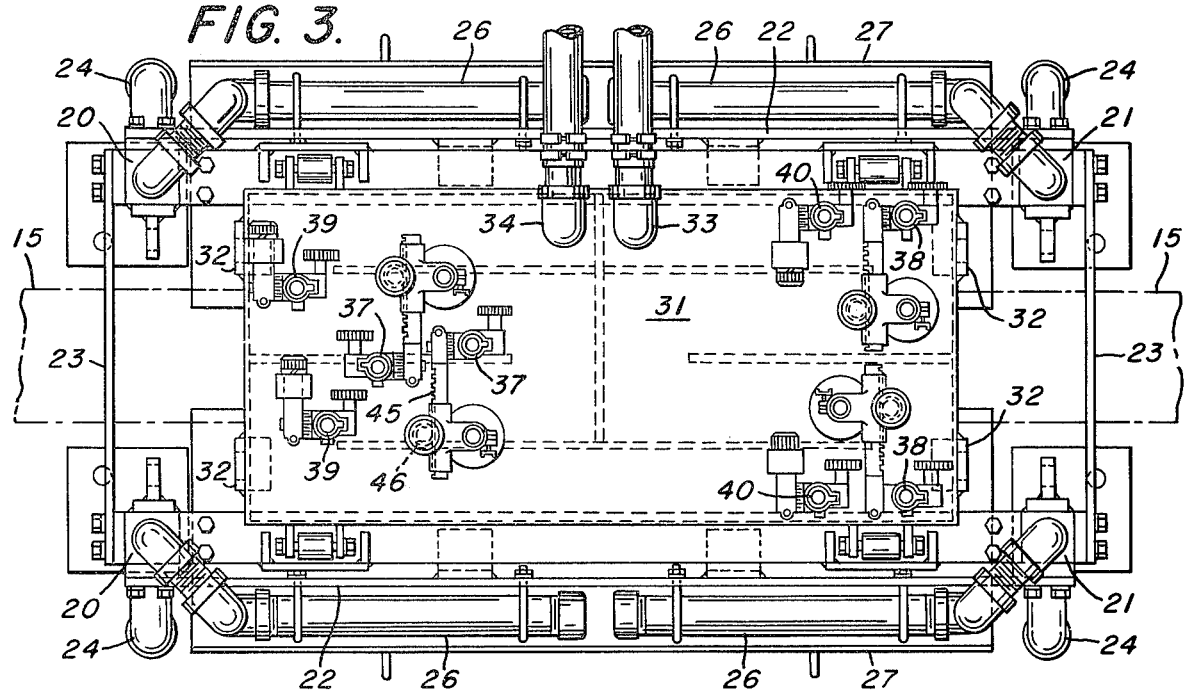
FIG. 3 is a top plan view of our apparatus.
Figure 4:
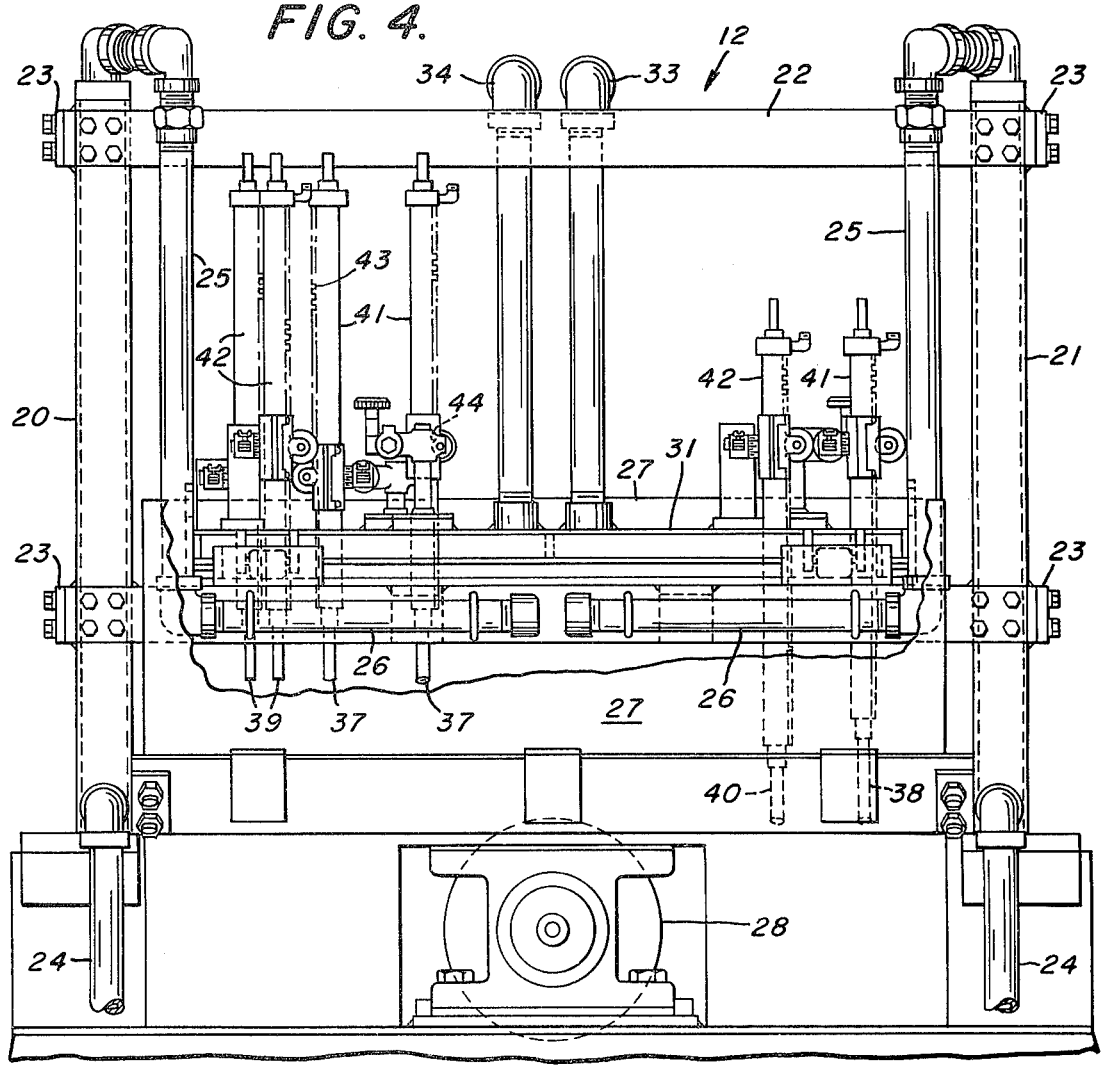
FIG. 4 is a side elevational view of our apparatus with parts broken away.
Figure 5:
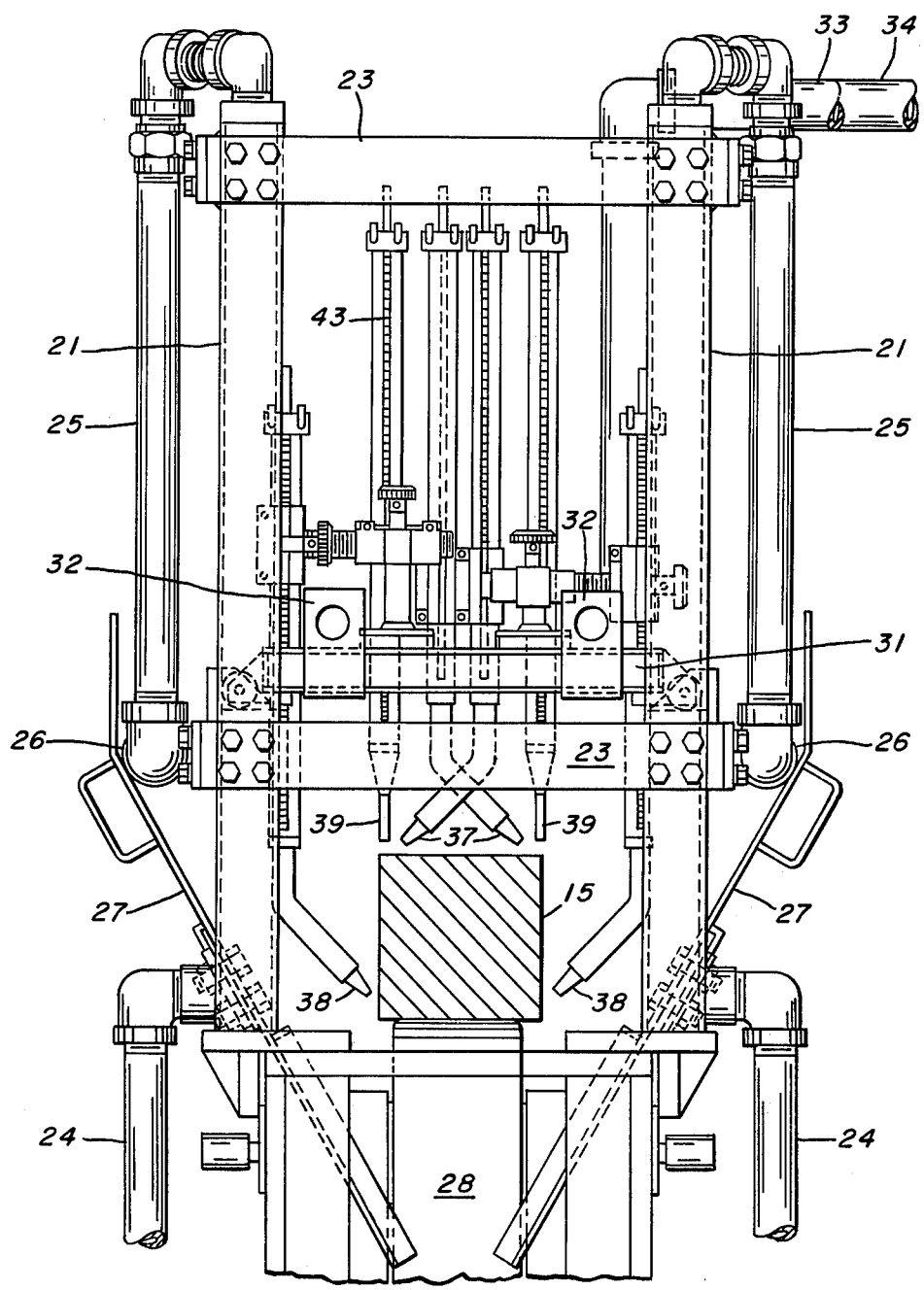
FIG. 5 is an end elevational view from the right of FIGS. 3 and 4.

As shown in FIGS. 3, 4 and 5, our flame-cutting apparatus 12 comprises a frame formed of two water-cooled supporting columns 20 at the entry end, two similar columns 21 at the exit end, and longitudinal and transverse brace members 22 and 23 attached to the columns. Cooling water is introduced to the lower ends of the columns through respective inlet pipes 24 and discharges from the upper ends through respective downcomers 25 into horizontally extending headers 26. The frame carries chutes 27 for receiving material removed from the workpiece 15, as hereinafter explained. The headers 26 discharge water over the chutes 27 and thus cool them. The frame straddles the workpiece 15, which is supported on conveyor rolls 28 as it travels through the apparatus.

A water-cooled platform 31 is supported for vertical movement above the workpiece 15 on columns 20 and 21. The platform has lifting eyes 32 to be engaged by cables or the like for raising it away from the workpiece when the flame-cutting apparatus is not used. A water inlet 33 and outlet 34 are connected to the platform, which is hollow and contains a suitable arrangement of internal baffles for circulating the water.

Platform 31 carries a pair of top cutting torches 37, a pair of bottom cutting torches 38, a pair of top preheat torches 39 and a pair of bottom preheat torches 40. The torches per se are of conventional construction which are capable of burning a combustible gas, preferably in oxygen, to preheat and flame-cut the metal of the workpiece. The preheat torches serve also to remove scale from the workpiece. The embodiment of FIG. 1 may require additional preheat torches (not shown), since the workpiece is not at as high a temperature when it reaches the apparatus as in the embodiment of FIG. 2. Each cutting torch 37 and 38 is mounted at the bottom of a respective water-cooled stem 41, the position of which can be adjusted both horizontally and vertically relative to the platform. Likewise each preheat torch 39 and 40 is mounted at the bottom of a respective water-cooled stem 42, the position of which can be adjusted at least vertically relative to the platform. The vertical adjusting means includes gear racks 43 on the respective stems, and hand operated pinions 44 engaging the gear racks. The horizontal adjusting means includes gear racks 45 and pinions 46 engaging the latter gear racks.

Figure 6:
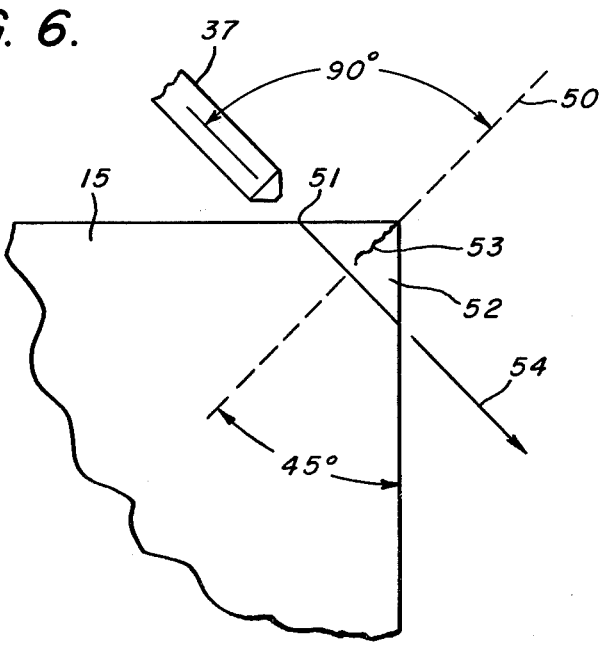
FIG. 6 is a diagrammatic end view of the upper right corner portion of a continuously cast workpiece illustrating the preferred relation between the workpiece and torch.

In accordance with our invention and as shown in FIGS. 5 and 6, each of the four cutting torches 37 and 38 is aimed downwardly at an angle of about 35° to 55° with respect to the vertical (or horizontal) and at an angle of about 80° to 100° with respect to a plane 50 which bisects the corner angle of the workpiece 15. Preferably the torches are aimed downwardly at angles of about 45° and approximately perpendicular to the bisecting planes (FIG. 6). Consequently each torch cuts along a line 51 which lies at a closely controlled distance from the exact corner of the workpiece. The location of this line determines the depth of material removed during the cutting operation. There is no tendency for the torches to cut farther into the workpiece toward the center. The material 52 removed is shaped as a right triangle in cross section, and cracks 53 lie approximately on the altitude of the triangle. The dimensions of the triangle can be varied by adjusting the position of the torches relative to the platform 31. The material removed from the workpiece should be directed in a straight line 54 away from the surface of the workpiece. Therefore we apply sufficient pressure at the torches to assure that the material travels in the direction in which each torch is aimed. This material impinges on the chutes 27 and drops from the bottom of the apparatus where it does not adversely affect the quality of the workpiece. When the workpiece is subjected to in-line rolling, as in both embodiments illustrated, the rolling operation produces the same corner configuration on the workpiece throughout its length, now free of cracks. This configuration may be either square or with a radius, but the portions where flame-cutting has taken place are indistinguishable from the other portion. Although FIG. 6 shows only the upper right corner portion of the workpiece, the relation between the workpiece and torch is the same at the other three corners.

From the foregoing description, it is seen that our invention affords a simple method and apparatus for flame-cutting the corner portions of a continuously cast workpiece to eliminate cracks. The invention aims the torches in a way which overcomes the difficulties encountered in the prior art in using cutting torches to eliminate corner cracks. The torches are readily moved away from the workpiece whenever they are not needed.

We claim:

1. In a continuous-casting operation in which a workpiece at an elevated temperature travels within a casting machine and is subject to having cracks form in its corners, a method of flame-cutting a cracked corner portion from the workpiece comprising moving the workpiece past a cutting torch which is aimed at an angle of about 80° to 100° with respect to a plane which bisects the adjacent corner angle of the workpiece, whereby the torch cuts the workpiece along a line spaced from the corner and removes a segment of material which is triangular in cross section.

2. A method as defined in claim 1 in which said torch is aimed downwardly at an angle of about 45° and in a direction approximately perpendicular to said plane.

3. A method as defined in claim 1 in which the workpiece is rectangular in cross section and portions are cut from a plurality of its corners.

4. A method as defined in claim 1 in which the cutting step is performed on the workpiece after it is straightened and traveling horizontally.

5. A method as defined in claim 4 in which the operation includes the further steps of reheating the workpiece and subjecting it to in-line rolling, and the cutting step precedes the reheating step, said in-line rolling step producing the same corner configuration on the workpiece throughout its length.

6. A method as defined in claim 4 in which the operation includes the further steps of reheating the workpiece and subjecting it to in-line rolling, and the cutting step follows the reheating step, said in-line rolling step producing the same corner configuration on the workpiece throughout its length.

7. A method as defined in claim 1 including the further step of preheating the corner portion of the workpiece before cutting it.

8. In a continuous-casting installation which includes means for carrying a workpiece at an elevated temperature along a path of travel, the combination therewith of a flame-cutting apparatus for removing cracked corner portions from the workpiece, said apparatus comprising a frame adjacent said path, and at least one cutting torch supported on said frame, said torch being located adjacent a corner of the workpiece and aimed at an angle of about 80° to 100° with respect to a plane which bisects the adjacent corner angle of the workpiece, whereby the torch cuts the workpiece along a line spaced from the corner and removes a segment of material which is triangular in cross section.

9. An apparatus as defined in claim 8 in which said torch is aimed downwardly at an angle of about 45° and in a direction approximately perpendicular to said plane.

10. An apparatus as defined in claim 8 comprising a plurality of cutting torches for removing portions from a plurality of corners of a workpiece of rectangular cross section.

11. An installation as defined in claim 8 which includes a straightener for removing a curved set from the workpiece, said path of travel being horizontal, said apparatus following said straightener.

12. An installation as defined in claim 11 which includes a reheating furnace and an in-line rolling mill following said straightener, and in which said apparatus precedes said furnace.

13. An installation as defined in claim 11 which includes a reheating furnace and an in-line rolling mill following said straightener, and in which said apparatus follows said furnace.

14. An apparatus as defined in claim 8 further comprising a preheating torch supported on said frame ahead of said cutting torch.

15. An apparatus as defined in claim 8 further comprising means on said frame connected with said cutting torch for adjusting the position of said cutting torch both vertically and horizontally relative to said frame.

16. An apparatus as defined in claim 8 further comprising means for moving said torch away from said path whenever the corner portion is not to be cut from the workpiece.

* * * * *